(12) United States Patent
Braun et al.

(10) Patent No.: US 11,841,206 B1
(45) Date of Patent: Dec. 12, 2023

(54) QUIVER FOR BOWFISHING ARROWS AND ACCESSORIES

(71) Applicant: AMS, LLC, Stratford, WI (US)

(72) Inventors: Jeff Braun, Stratford, WI (US); Tim Morines, Abbotsford, WI (US)

(73) Assignee: AMS, LLC, Stratford, WI (US)

( * ) Notice: Subject to any disclaimer, the term of this patent is extended or adjusted under 35 U.S.C. 154(b) by 0 days.

(21) Appl. No.: 17/853,413

(22) Filed: Jun. 29, 2022

(51) Int. Cl.
*F41B 5/06* (2006.01)
*A01K 81/04* (2006.01)
*F41B 5/10* (2006.01)
*F41B 5/14* (2006.01)

(52) U.S. Cl.
CPC .............. *F41B 5/066* (2013.01); *A01K 81/04* (2013.01); *F41B 5/105* (2013.01); *F41B 5/1488* (2013.01)

(58) Field of Classification Search
CPC .......... F41B 5/06; F41B 5/066; F41B 5/1488; A01K 81/04
USPC .................................. 124/25.7, 86, 88, 41.1
See application file for complete search history.

(56) References Cited

U.S. PATENT DOCUMENTS

| | | | | | |
|---|---|---|---|---|---|
| 2,768,669 | A | * | 10/1956 | Kinnee | F41B 5/063 124/25.7 |
| 2,897,864 | A | * | 8/1959 | Schmidt | F41B 5/063 124/25.7 |
| 2,969,898 | A | * | 1/1961 | Ramsey | F41B 5/066 124/25.7 |
| 2,997,999 | A | * | 8/1961 | Crowder | F41B 5/066 124/25.7 |
| 3,017,874 | A | * | 1/1962 | Gubash | F41B 5/066 124/25.7 |
| 3,108,725 | A | * | 10/1963 | Ramsey | F41B 5/066 124/25.7 |
| 3,116,730 | A | * | 1/1964 | Tingley | F41B 5/066 224/916 |
| 3,337,099 | A | * | 8/1967 | Rose | F41B 5/063 224/916 |
| 3,434,638 | A | * | 3/1969 | Beynon | F41B 5/063 124/25.7 |
| 3,561,651 | A | * | 2/1971 | Ramsey | F41B 5/066 124/25.7 |
| 3,696,978 | A | * | 10/1972 | Gentellalli | F41B 5/063 124/25.7 |
| 3,716,174 | A | * | 2/1973 | Ehlert | F41B 5/066 124/25.7 |
| 4,020,984 | A | * | 5/1977 | Morris | F41B 5/066 124/25.7 |
| 4,156,496 | A | * | 5/1979 | Stinson | F41B 5/066 124/25.7 |
| 4,169,454 | A | * | 10/1979 | Jones | F41B 5/1465 473/585 |

(Continued)

*Primary Examiner* — Alexander R Niconovich
(74) *Attorney, Agent, or Firm* — Boyle Fredrickson S.C.

(57) ABSTRACT

A bow has an arrow quiver further attached to a bowfishing bow or reel. The arrow quiver provides a clip that advantageously holds at least one arrow shaft along the bowfishing riser without interference with the line during use and may further hold one or more replacement tips and tools commonly used during the course of bowfishing. The replacement tips are stored to be easily accessible with the sharp points of the tips directed away from the user to avoid injury. Further, small hand tools, such as Allen wrenches or hex keys, are stored on the quiver in a manner which improves flexibility of the arrow clip.

16 Claims, 3 Drawing Sheets

(56) References Cited

U.S. PATENT DOCUMENTS

| | | | | |
|---|---|---|---|---|
| 4,247,027 A | * | 1/1981 | Tardiff | F41B 5/066 124/25.7 |
| 4,387,805 A | * | 6/1983 | Lanius | F42B 39/007 224/916 |
| 4,541,403 A | * | 9/1985 | DeBlois | F41B 5/1438 124/25.7 |
| 4,584,983 A | * | 4/1986 | Ament | F41B 5/1426 473/578 |
| 4,788,961 A | * | 12/1988 | Toth | F41G 1/467 124/25.5 |
| 4,823,764 A | * | 4/1989 | Knaack | F41B 5/066 224/916 |
| 4,955,355 A | * | 9/1990 | Pugh | F41B 5/143 124/25.7 |
| 4,995,372 A | * | 2/1991 | Topel | F41B 5/066 124/25.7 |
| 5,190,022 A | * | 3/1993 | Larson | F41B 5/066 124/25.7 |
| 5,452,703 A | * | 9/1995 | Bateman, III | F41B 5/066 124/25.7 |
| 5,803,069 A | * | 9/1998 | Schreiber | F41B 5/063 124/25.7 |
| 6,006,734 A | * | 12/1999 | Sodaro | F41B 5/066 224/916 |
| 6,105,566 A | * | 8/2000 | Tiedemann | F41B 5/066 124/25.7 |
| 6,390,085 B1 | * | 5/2002 | Stinson | F41B 5/066 124/25.7 |
| 6,691,694 B2 | * | 2/2004 | Stinson | F41B 5/066 224/916 |
| 7,367,331 B1 | * | 5/2008 | Horinek | F41B 5/066 224/916 |
| 7,942,141 B1 | * | 5/2011 | Love | F41B 5/066 224/916 |
| 7,987,842 B2 | * | 8/2011 | McPherson | F41B 5/148 224/916 |
| 8,061,341 B2 | * | 11/2011 | Hudkins | F41B 5/066 124/25.7 |
| 8,434,467 B2 | * | 5/2013 | LoRocco | F41B 5/066 124/86 |
| 8,499,754 B2 | * | 8/2013 | Vergin | F41B 5/14 206/315.11 |
| 8,839,772 B2 | * | 9/2014 | Lee | F41B 5/066 224/916 |
| 8,931,469 B2 | * | 1/2015 | Kingsbury | F41B 5/066 124/88 |
| 9,163,895 B2 | * | 10/2015 | Pedersen | F41B 5/066 |
| 9,372,045 B1 | * | 6/2016 | Kempf | F41B 5/066 |
| 9,400,153 B2 | * | 7/2016 | Evans | F41B 5/066 |
| 9,903,682 B1 | * | 2/2018 | Fyksen, Jr. | F41B 5/066 |
| 10,345,071 B2 | * | 7/2019 | LaBreche | F41B 5/06 |
| 10,801,801 B2 | * | 10/2020 | Houle | F41B 5/066 |
| 10,801,802 B2 | * | 10/2020 | Long | F41B 5/066 |
| 10,948,259 B2 | * | 3/2021 | Keller | F41B 5/1492 |
| 11,585,626 B2 | * | 2/2023 | Larson | F41B 5/066 |
| 2002/0062826 A1 | * | 5/2002 | Proctor | F41B 5/066 124/86 |
| 2006/0065261 A1 | * | 3/2006 | Files | F41B 5/066 124/25.7 |
| 2006/0112945 A1 | * | 6/2006 | Rager | F41B 5/066 124/86 |
| 2008/0302346 A1 | * | 12/2008 | Notestine | F41B 5/066 124/25.7 |
| 2013/0167822 A1 | * | 7/2013 | Walk | F41B 5/066 29/428 |
| 2014/0182572 A1 | * | 7/2014 | Barnett | F41B 5/066 124/25.7 |
| 2018/0128586 A1 | * | 5/2018 | Warner | B65D 43/02 |
| 2022/0214131 A1 | * | 7/2022 | Trpkovski | F41B 5/123 |

* cited by examiner

QUIVER FOR BOWFISHING ARROWS AND ACCESSORIES

CROSS-REFERENCE TO RELATED APPLICATIONS

Background of the Invention

The present invention relates to bowfishing devices and, more particularly, to a quiver suitable for holding bowfishing arrows and other accessories on a bowfishing bow.

The sport of bowfishing involves using specialized bows and arrows to shoot and retrieve fish. In bowfishing, one end of the bowfishing line is attached to a barbed arrow so that when the arrow is shot, the line pays out allowing the arrow and fish to be retrieved by reeling the line in. Typically, a single arrow is shot and retrieved multiple times, therefore, the arrow is more durable than conventional hunting arrows in order to withstand multiple shots. However, a second arrow may be desired as a "back-up" arrow, or to switch between different types of arrows depending on the shooting conditions.

Once the arrow is shot, the arrow barbs will retain the fish and the arrow tip loosened to release the barbs and remove the arrowhead completely from the fish. Arrowheads of this type are described in, e.g., U.S. Pat. No. 9,146,085, "Bowfishing Arrowhead with Improved Barb Release," assigned to the assignee of the present application, and hereby incorporated by reference.

Bowfishing arrow tips are chosen based on the type and size of fish planned to be shot and the environment in which the arrow will be shot (e.g., deep or shallow waters or rocky riverbeds). The arrow tips may differ in shape and size, material hardness, tip sharpness (e.g., to penetrate hard scaled fish), and accommodations for desired features of the tip (e.g., quick release barbs).

Although arrow tips are reused, they will naturally wear over time or may become damaged or lost through use. Therefore, many arrows provide replacement tips that can be replaced instead of replacing the entire arrowhead. The arrow tips are often replaced during the course of bowfishing but can easily get lost and are burdensome to replace while bowfishing.

SUMMARY OF THE INVENTION

The present invention provides a bow having an arrow quiver further attached to a bowfishing bow or reel. This arrow quiver provides a clip that advantageously holds at least one arrow shaft along the bowfishing riser without interference with the line during use and may further hold one or more replacement tips and tools commonly used during the course of bowfishing. The replacement tips are stored to be easily accessible with the sharp points of the tips directed away from the user to avoid injury. Further, small hand tools, such as Allen wrenches or hex keys, are stored on the quiver in a manner which improves flexibility of the arrow clip.

The arrow quiver is adaptable to be used with a wide range of different bow and reel designs and arrangements.

In one embodiment, the present invention may provide a bowfishing bow assembly comprising a bow riser having upper and lower ends extending along an axis and supporting a grip portion: a top limb extending from the upper end of the bow riser at an upward angle to the axis of the bow; a bottom limb extending from the lower end of the riser at a downward angle to the axis of the bow; a bowstring extending between the distal ends of the top limb and the bottom limb to be tensioned by flexure of the top and bottom limbs; and a quiver attachable to the bow riser and providing an inwardly tensioned channel extending along the axis of the bow configured to hold an arrow shaft and at least cylindrical bore having a longitudinal axis extending perpendicular to the axis of the bow configured to hold at least one arrow tip.

It is thus a feature of at least one embodiment of the invention to provide convenient storage of various bowfishing accessories such as replacement arrow tips in a manner which does not interfere with the bowfishing bow and minimizes risk to injury by orienting sharp arrow points away from the user.

The quiver housing may support longitudinal extension of an arrow shaft along the axis of the bow and lateral extension of arrow tips perpendicular to the axis of the bow.

It is thus a feature of at least one embodiment of the invention to provide quick retrieval of replacement arrow tips on an arrow quiver holding a bowfishing arrow shaft and to permit the user to easily view the arrow tips and select between different types of arrow tip types.

Arrow tips may extend along an axis that is perpendicular to the axis of the bow.

It is thus a feature of at least one embodiment of the invention to provide replacement arrow tips that may be selectively chosen based on the environment and the type of fish to be caught.

At least one cylindrical bore may have a diameter between 0.25 to 0.35 inches and approximately 0.25 inches. At least one cylindrical bore may have a depth between 0.05 to 0.15 inches and approximately 0.1 inches.

It is thus a feature of at least one embodiment of the invention to permit press fit/friction fit connection between the cylindrical bores and the stems of commonly used bowfishing arrow tips sized to fit a standard 0.25 inch arrow shaft.

The quiver may further provide at least one non-cylindrical bore extending along the axis of the bow.

It is thus a feature of at least one embodiment of the invention to provide additional storage for bowfishing accessories and commonly used tools such as hex keys in a manner which minimizes the risk of losing the tools by forming the shape of the bore to the tool.

At least one non-cylindrical bore may have a hexagonal cross section.

It is thus a feature of at least one embodiment of the invention to allow for a natural suspension of the hex keys through the bore holes which allow the bent arm of the tool to keep the hex key from passing through the hole.

At least one non-cylindrical bore may pass to the inwardly tensioned channel.

It is thus a feature of at least one embodiment of the invention to allow for greater outward flexibility of the arrow shaft clip arms by extending the depth of the gap between the clip arms.

At least one non-cylindrical bore may be various sized hex bores. The hex bores may have a size that is approximately 3/32 to 3/8 inches across in diameter (measured from one side to the side directly across from it).

It is thus a feature of at least one embodiment of the invention to anticipate use of common hex tools for bowfishing apparatus and provide matching bores for holding such hex tools in a "locked" keyed orientation.

The quiver housing may be attached to the bow riser by means of a screw passing through the bow riser.

The quiver housing may support an axis of rotation of the quiver housing substantially parallel to the axis of the bow.

It is thus a feature of at least one embodiment of the invention to allow the quiver housing to be selectively angled with respect to the bow riser to position the quiver housing away from the user's drawing arm.

The quiver housing may be attached to the bow riser by means of a screw passing through the bow riser.

It is thus a feature of at least one embodiment of the invention to allow the quiver housing to be fixedly attached to the bow riser.

The quiver housing may be attached to the bow riser by means of a tension clip clipping onto the bow riser.

It is thus a feature of at least one embodiment of the invention to allow the quiver housing to be rapidly attached to the bow riser through a tension clip connection and that may be easily applied and removed.

In one embodiment, the present invention may provide a quiver for holding a bowfishing arrow shaft comprising a housing extending between a top and a bottom of the bowfishing arrow shaft along an axis; a retention clip supported by the housing providing outwardly extending arms extending outwardly from the housing with the arms providing a channel therebetween adapted to hold the bowfishing arrow shaft along the axis; and at least one bore supported by the housing adapted to hold at least one arrow tip perpendicular to the axis.

At least one bore may be supported by the housing and may be adapted to hold at least one manual tool. At least one bore may have a hexagonal cross section.

These particular objects and advantages may apply to only some embodiments falling within the claims and thus do not define the scope of the invention.

DETAILED DESCRIPTION OF THE INVENTION

Figure 1:
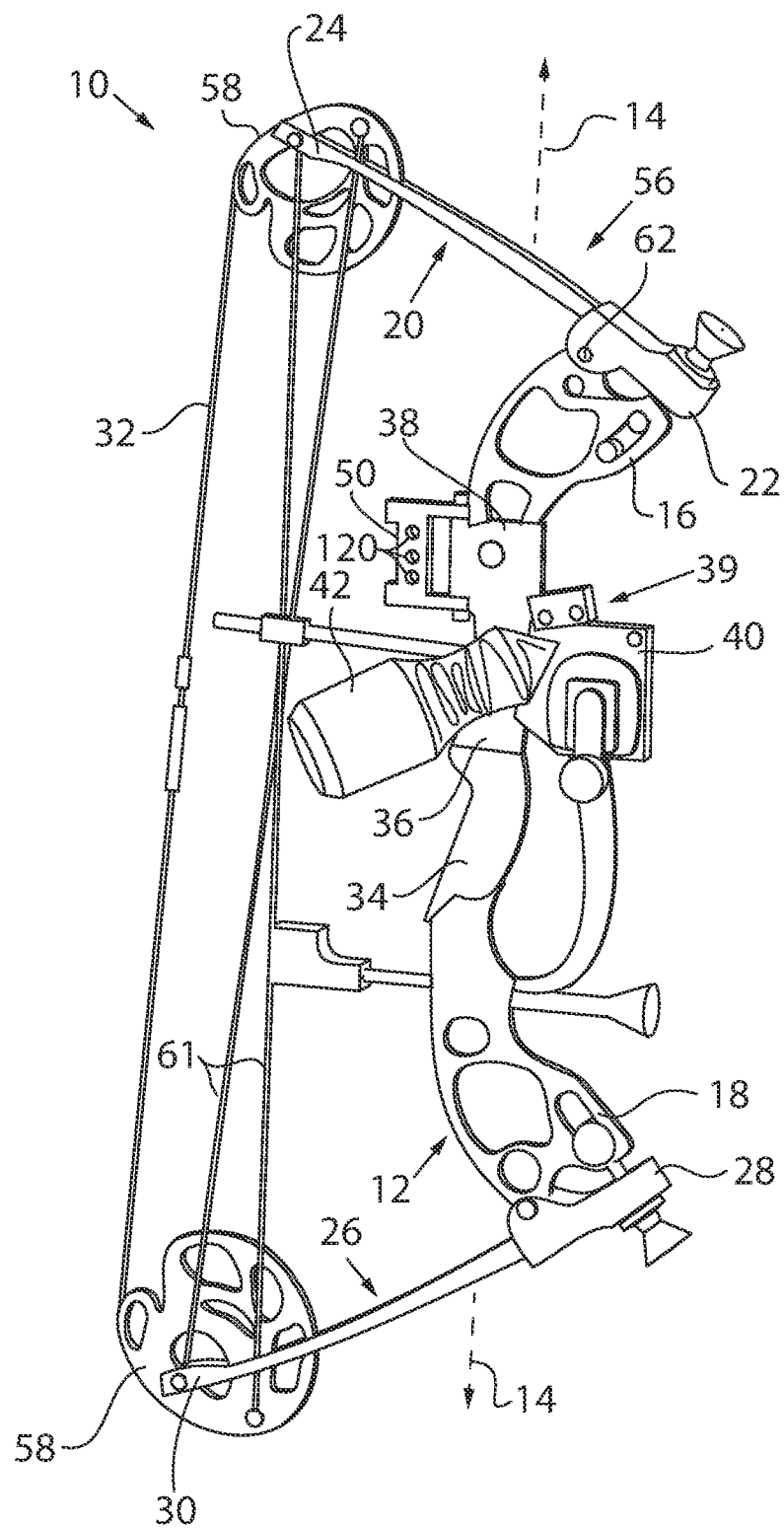
FIG. 1 is a side view of a bowfishing bow of the present invention illustrating an arrow quiver attached to a bow frame having a longitudinally extending bow riser supporting a top limb and bottom limb extending upwardly and downwardly, respectively, therefrom and having a bowstring extended between distal ends of the top limb and bottom limb.

Referring now to FIG. 1, a bowfishing bow 10 suitable for use with the present invention may include a bow riser 12 extending longitudinally along an axis 14 and having top 16 and bottom 18 ends at a respective top and bottom of the bow riser 12.

Extending rearwardly and upwardly from the top end 16 with respect to axis 14 is a top limb 20. A proximal end 22 of the top limb 20 is connected to the bow riser 12. Similarly, extending rearwardly from the bottom end 18 and tipped downward form the bottom end 18 is a bottom limb 26 extending along a downwardly tipped angle with respect to axis 14. The bottom limb 26 is connected at a proximal end 28 to the bow riser 12 opposite a distal end 30 extending away from the bow riser 12.

The top 16 and bottom 18 ends of the bow riser 12 may be attached to the top limb 20 and bottom limb 26, respectively, at limb joints securing the top limb 20 and bottom limb 26 to the bow riser 12 and allowing the curvature of the limbs to be adjusted to adjust the draw weight, as will be further explained below.

Extending substantially parallel to the bow riser 12 and strung between pulleys on the distal ends 24, 30 of the top limb 20 and bottom limb 26 is a bowstring 32 that is drawn back with an arrow (not shown) to facilitate arrow flight. The pulleys may include a number of cams 58 having an eccentric, noncircular shape giving the user a mechanical advantage when shooting the arrow. In one embodiment, a dual cam system uses two rotatable cams 58 at the distal ends 24, 30 of the top limb 20 and bottom limb 26. The cams 58 are connected or slaved to one another via cables 61 to allow the cams 58 to move in synchronicity with the drawing back of the arrow. The bowstring 32 is connected at outer ends of the cams 58 such that when the bowstring 32 is drawn back the cams 58 rotate and impart force to compress the limbs 20, 26. As the cams 58 are rotated, the force required to hold the bow 10 reaches a peak and then decreases as the bow 10 reaches maximum extension, known as "let-off" allowing the user to maintain the drawn bow 10 and properly aim the arrow, as understood in the art.

In use, the bowfishing bow 10 is positioned such that the bow riser 12 is held away from the user and the bowstring 32 is positioned toward the user. The bow riser 12 may provide a grip 34 generally positioned below a midpoint between the top 16 and bottom 18 ends and along an inner face of the bow riser 12 receiving a palm of the user's hand with fingers gripped around the outer face of the bow riser 12 to hold the bow riser 12 upright along the axis 14. The grip 34 provides a surface that receive the fingers and thumb of the user in opposition to grasp around the axis 14 and resist sliding of the bow riser 12 along the axis 14 through the grasp. Above the grip 34 is an arrow rest 36 providing an upper ledge extending laterally from the bow riser 12 for supporting the cylindrical arrow shaft and keeping the arrow steady as it is being drawn back by the user.

The bow riser 12 may carry a number of components permitting and facilitating use of the bow 10 by a user. For example, above the arrow rest 36, a reel mounting bracket 38 may attach a bowfishing reel 39. The reel mounting bracket 38 may be attached to the bow riser 12 above the grip 34 by screws, by a tension clip, and by other known attachment mechanisms. In one embodiment, the bowfishing reel 39 provides a winding mechanism 40 communicating with a plastic bottle 42 holding the bowfishing line 44. A bowfishing reel suitable for use in this purpose is described in U.S. Pat. Nos. 4,383,516 and 6,634,350 owned by the present applicant and hereby incorporated by reference.

Figure 2:
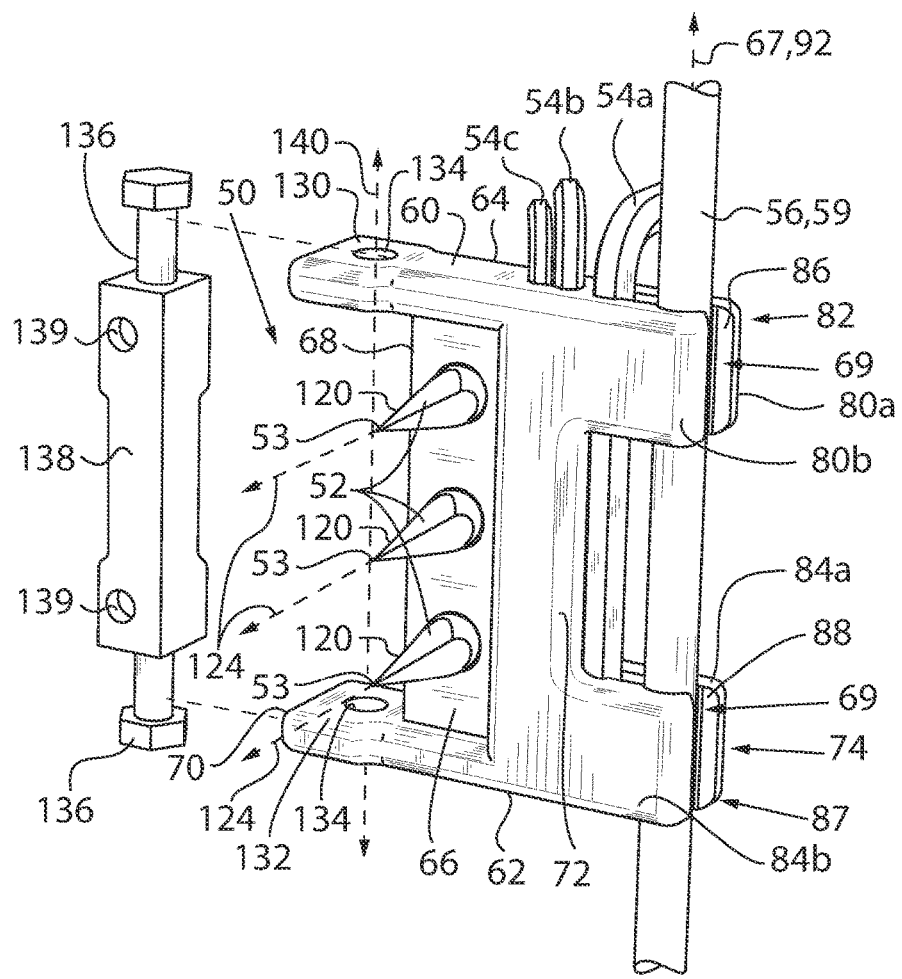
FIG. 2 is a perspective view of one embodiment of the arrow quiver of FIG. 1 shown to support a connector block for attachment to a bow riser and the arrow quiver configured to clip an arrow shaft extending along a longitudinal axis of the bow riser and further holding three arrow tip bores extending perpendicular to the longitudinal axis and hex tool bores extending along the longitudinally axis consistent with an axis of the arrow shaft.

Referring also to FIG. 2, the reel mounting bracket 38 may further support a quiver housing 50 according to the teachings of the present invention. The quiver housing 50 may be a generally rectangular housing providing features which allow for the support of a bowfishing arrow 59 extending along the bow riser 12 and its axis 14 and also supports a plurality of arrow tips 52 and hex keys 54 which provide easy access to the various accessories while the user is gripping the bow riser 12 as further described below.

The quiver housing 50 provides an upper wall 60 opposite a lower wall 62 and joined on left and right edges by a left wall 64 and a right wall 66, respectively. A front wall 68 of the quiver housing 50 provides a forwardly extending attachment end 70 supporting an attachment between the quiver housing 50 and the reel mounting bracket 38 as shown in FIG. 1, and in some embodiments may support an attachment between the quiver housing 50 and a connector block 138 as shown in FIG. 2. A rear wall 72 of the quiver housing 50, opposite the attachment end 70 of the quiver housing 50, provides a rearward extending clip 74 supporting an attachment between the quiver housing 50 and a vertically extending arrow shaft 56 of the bowfishing arrow 59.

The rearward extending clip 74 of the quiver housing 50 provides an upper pair of arms 80 that extend rearwardly from the left wall 64 and right wall 66, respectively, at an upper end 82 of the quiver housing 50 and a lower pair of arms 84 that extend rearwardly from the left wall 64 and right wall 66, respectively, at a lower end 87 of the quiver housing 50. The upper pair of arms 80 and the lower pair of arms 84 engage discrete upper and lower areas, respectively, of the arrow shaft 56 to stabilize and prevent rotation of the arrow shaft 56 as the arrow shaft 56 extends along a shaft axis 67 that is generally parallel to the axis 14 of the bow riser 12.

Specifically, the upper pair of arms 80 provide a left arm 80a that extends rearwardly from the left wall 64 and a right arm 80b that extends rearwardly from the right wall 66, the upper pair of arms 80 protruding from the rear wall 72 to form parallel extending arms with a gap 69 therebetween. The upper pair of arms 80 extend perpendicular to the shaft axis 67 and form U-shaped spring "clips" clipping around the arrow shaft 56. In this respect, the left arm 80a and right arm 80b are tensioned inwardly to securely hold the arrow shaft 56. The upper arms 80 may further include indentations on inner surfaces 86 of the upper arms 80 which, when used in combination with the lower pair of arms 84, provide holding channels for receiving the arrow shaft 56 and at least one hex key 54 as further described below.

The lower pair of arms 84 is similar to the upper pair of arms 80 and provides a left arm 84a that extends rearwardly from the left wall 64 and a right arm 84b that extends rearwardly from the right wall 66, the lower pair of arms 84 protruding from the rear wall 72 to form parallel arms with a gap 69 therebetween. The lower pair of arms 84 extend perpendicular to the shaft axis 67 and form U-shaped spring "clips" clipping around the arrow shaft 56. In this respect, the left arm 84a and right arm 84b are tensioned inwardly to securely hold the arrow shaft 56. The lower arms 84 may further include indentations on inner surfaces 88 of the lower arms 84 which, when used in combination with the upper pair of arms 80, provide holding channels for receiving the arrow shaft 56 and at least one hex key 54 as further described below.

Figure 3:
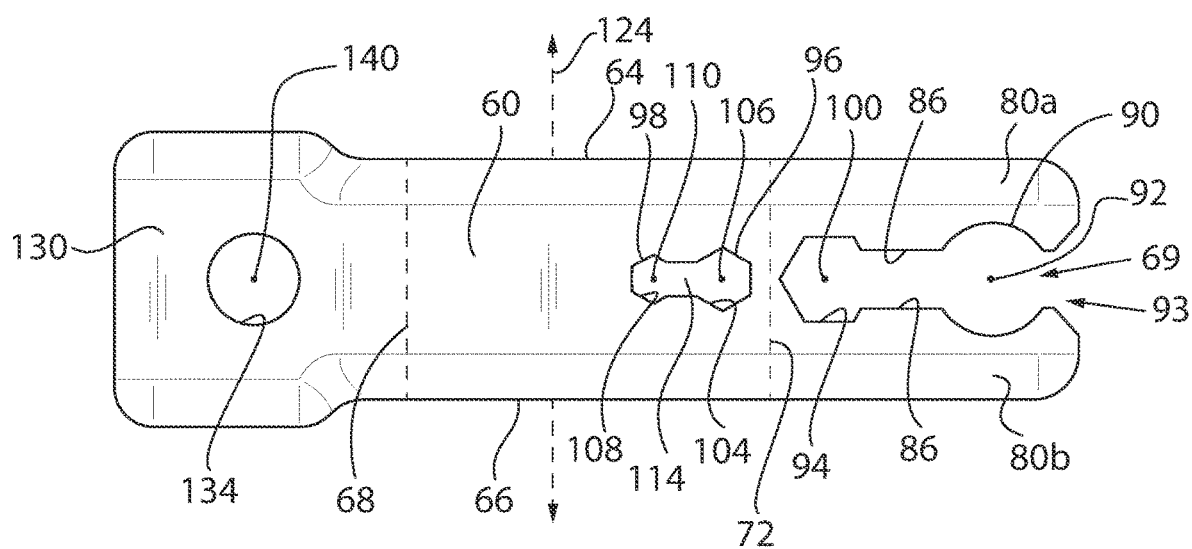
FIG. 3 is a top plan view of the arrow quiver of FIG. 1 showing three hex tool bores positioned parallel to the arrow shaft bore.

Referring now also to FIG. 3, a shaft bore 90 may be formed along the shaft axis 67 of the quiver housing 50 and may be sized to hold and retain the arrow shaft 56 by clipping along the shaft axis 67. The shaft bore 90 may be a generally cylindrical hole having a substantially circular cross section with a central axis 92 commensurate with the shaft axis 67. The shaft bore 90 may be thus formed by a concave groove formed within the inner surfaces 86 and 88 of the upper and lower arms 80 and 84 and the gap 69 between the left arms 80a, 84a and the right arms 80b, 84b, respectively. The shaft bore 90 is formed at the distal end of the upper and lower arms 80 and 84 and thus the gap 69 extends from the shaft bore 90 to the outer edges of the upper and lower arms 80 and 84 to provide an insertion opening 93 whereby the arrow shaft 56 may be inserted into the shaft bore 90. The shaft bore 90 may have of a diameter between 0.25 to 0.35 inches and approximately 0.25 inches.

The quiver housing 50 may further support a series of hex bores 94, 96, 98, for example incrementally increasing in size, formed along the shaft axis 67 and sized to hold and retain commonly used hex keys 54 along the shaft axis 67. It is understood that the bent ends of the hex keys 54 may extend from the top of the hex bores 94, 96, 98 so that the bent ends of the hex keys 54 remain above the bores and retain the hex keys 54 without passing through the bores 94, 96, 98. At least one hex bore 94 may be integrally formed with the shaft bore 90 and the remaining hex bores 96, 98 may be separately or integrally formed within the quiver housing 50, separate from the shaft bore 90.

A large hex bore 94 may be a hexagonal hole extending between the upper wall 60 and the lower wall 62 and having a substantially hexagonal cross section with a central axis 100 parallel to the shaft axis 67. The large hex bore 94 may be formed by indentations formed within the inner surfaces 86 and 88 of the upper and lower arms 80 and 84 and the gap between the left arms 80a, 84a and the right arms 80b, 84b, respectively.

The large hex bore 94 is formed at the proximal end of the upper and lower arms 80 and 84 near the rear wall 72 of the quiver housing 50 and thus the gap 69 between the left arms 80a, 84a and the right arms 80b, 84b, respectively, extends from the large hex bore 94 to the shaft bore 90 to connect the large hex bore and the shaft bore 90. The joining of the large hex bore 94 and the shaft bore 90 may assist with the formation of the holes by allowing the large hex bore 94 and the shaft bore 90 to be formed by a singularly formed hole. The large hex bore 94 and the shaft bore 90 also allow for greater outward flexibility at the distal ends of the upper and lower arms 80 and 84. Therefore, the "clips" of the upper and lower arms 80 and 84 support an inwardly tensioned support of the arrow shaft 56 and a large sized hex key 54a, for example, a hex key size of ⅜ inch (measured from one flat side of the head to the one directly across from it), between the arms 80 and 84.

A medium hex bore 104 may be a hexagonal hole extending between the upper wall 60 and the lower wall 62 and having a substantially hexagonal cross section with a central axis 106 parallel to the shaft axis 67. The medium hex bore 104 may be formed within the quiver housing 50 between the left and right walls 64, 66 and closer to the rear wall 72 than the front wall 68 of the quiver housing 50. The medium hex bore 104 supports a medium sized hex key 54b, for example, a hex key size of ⅛ inch (measured from one flat side of the head to the one directly across from it).

A small hex bore 108 may be a hexagonal hole extending between the upper wall 60 and the lower wall 62 and having a substantially hexagonal cross section with a central axis 110 parallel to the shaft axis 67. The small hex bore 108 may be formed within the quiver housing 50 between the left and right walls 64, 66 and closer to the rear wall 72 than the front wall 68 of the quiver housing 50. The small hex bore 108 supports a small sized hex key 54c, for example, a hex key size of ³⁄₃₂ inch (measured from one flat side of the head to the one directly across from it).

The small hex bore 108 may be formed adjacent to the medium hex bore 104 such that a short rectangular connection channel 114 joins the holes of the small hex bore 108 and the medium hex bore 104. The joining of the small hex bore 108 and the medium hex bore 104 may assist with the formation o the holes by allowing the small hex bore 108 and medium hex bore 104 to be formed by a singularly formed hole.

Referring again to FIG. 2, the quiver housing 50 may further support a plurality of lateral bores 120 formed perpendicular to the shaft axis 67 and may be sized to hold and retain exposed arrow tips 52 with points 53 of the arrow tips 52 extending perpendicular to the shaft axis 67 when held within the quiver housing 50.

In one embodiment, the quiver housing 50 may support three lateral bores 120 which may be circular holes extending between the left and right walls 64, 66 and positioned closer to the front wall 68 than the rear wall 72 of the quiver housing 50. The lateral bores 120 may be sized to press or friction fit the stems of three arrow tips 52 so that the arrow tips 52 are securely held therein but are visible to the user. The lateral bores 120 have generally circular cross section with parallel central axes 124 of the lateral bores 120 extending perpendicular to the shaft axis 67. The lateral bores 120 may have diameters between 0.25 to 0.35 inches and at least 0.25 inches. The lateral bores 120 may have a depth between 0.05 to 0.15 inches and approximately 0.1 inches. The lateral bores 120 support at least three arrow tips 52 extending through the lateral bores 120 and the points 53 of the arrow tips 52 extending along the central axes 124 of the lateral bores 120 perpendicular to the shaft axis 67.

In one embodiment, the arrow tips 52 may have a diameter of approximately 0.3125 inches and therefore, the arrow tips 52 will be supported within lateral bores 120 that are between 0.25 to 0.35 inches and at least 0.25 inches. It is understood that the arrow tips 52 supported by the quiver housing 50 are sized to be received onto a standard sized arrow shaft 56, for example, having a shaft diameter that is between 0.25 to 0.35 inches and at least 0.25 inches, and a shaft length that is between 20 to 40 inches long and approximately 32 inches long. The arrow shaft 56 may be manufactured of high strength fiberglass, carbon, carbon-fiberglass, aluminum-fiberglass, and the like to survive impact with a stony bottom of a lake or stream.

The arrow tips 52 may have a rearward bore (optionally, having inward facing threads) that receives the front end of the arrow shaft 56 (optionally, having outward facing threads that mate with the inward facing threads of the tip). The arrow tips 52 may be manufactured of a hard material such as stainless steel, black oxide steel, and the like.

In one embodiment, the attachment end 70 of the quiver housing 50 provides an upper arm 130 that extends forwardly from the upper wall 60 and a lower arm 132 that extends forwardly from the lower wall 62. The upper arm 130 and lower arm 132 support corresponding bores 134 extending parallel to the shaft axis 67 and that may receive a bolt or screw 136 therethrough for further attachment as further described below.

Referring now to FIG. 2, in one embodiment, the bores 134 may support a bolt 136 that is further connected to a rectangular block connector 138 which provides a direct attachment of the block connector 138 to the bow riser 12 by example, bolts or screws extending through bores 139 of the block connector 138. The bolt 136 may allow for rotation of the quiver housing 50 about a central axis 140 of the bores 134 to allow for desired angle positioning of the quiver housing 50 and held bowfishing arrow 59 with respect to the bow riser 12. In this respect, the quiver housing 50 and bowfishing arrow 59 are angled about the central axis 140 of the bores 134 so as to not interfere with the bowstring 32 when shooting but can be angled after shooting for better viewing and access to the arrow tips 52 and hex keys 54. Further, the quiver housing 50 is angled to prevent inadvertent contact with the sharp arrow tips 52 during shotting.

Figure 4:
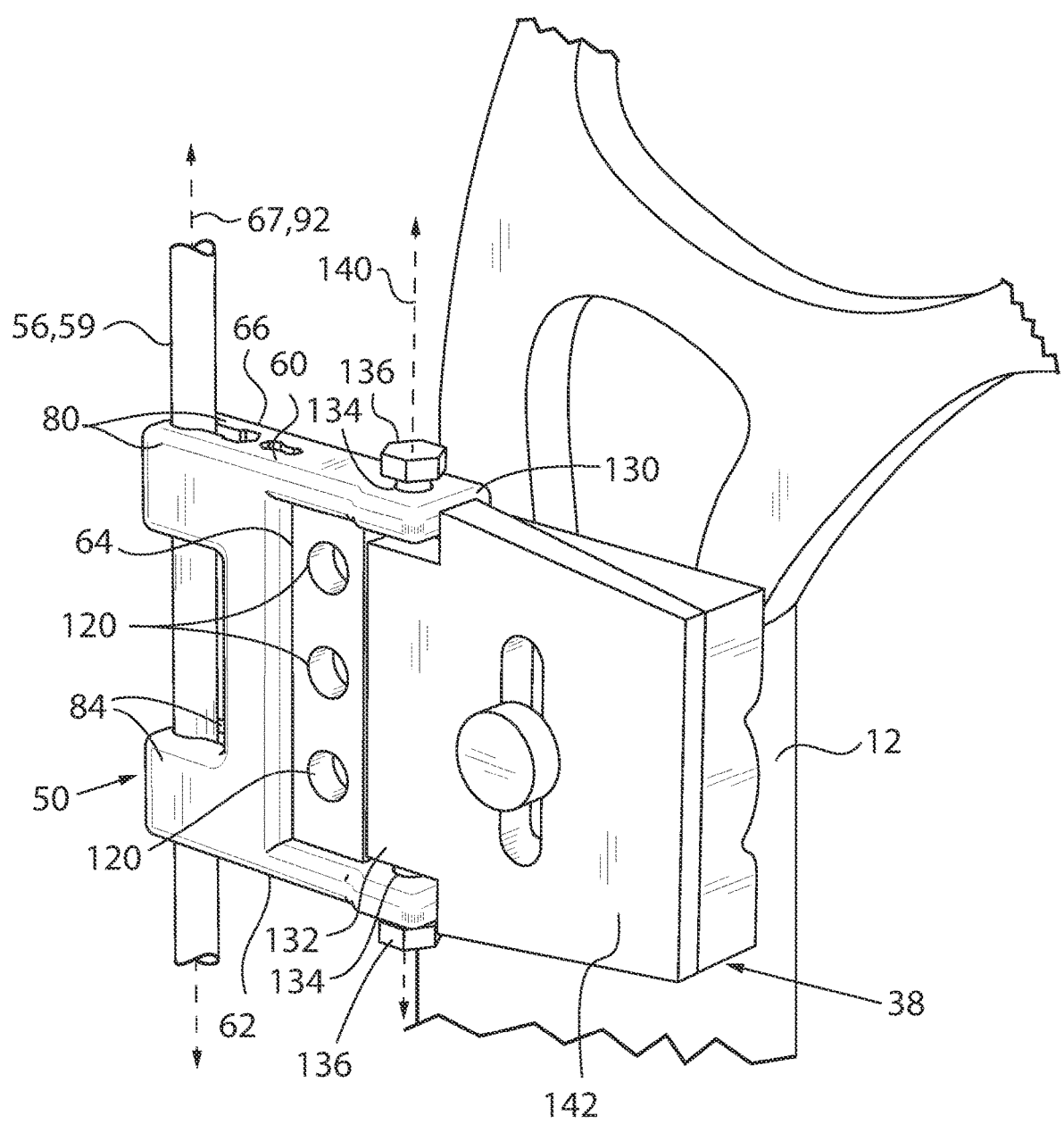
FIG. 4. is an enlarged perspective view of the arrow quiver of FIG. 1 separated from the bow riser and having a clamp attachment attachable to the bow riser.

Referring now to FIGS. 1 and 4, in an alternative embodiment, the bores 134 may support a bolt 136 that is further connected to the reel mounting bracket 38 which may attach to the bow riser 12 above the grip 34 by a tension clip 142 supported by the bolt 136 and having spring tensioned jaws able to open and close to grippingly clip around the bow riser 12, as also seen in FIG. 1. The reel mounting bracket 38 may also support the attachment of the bowfishing reel 39. Again, similar to FIG. 2, the bolt 136 may allow for rotation of the quiver housing 50 about the central axis 140 to allow for desired angled positioning of the quiver housing 50, bowfishing arrow 59, and arrow tips 52 with respect to the bow riser 12.

Certain terminology is used herein for purposes of reference only, and thus is not intended to be limiting. For example, terms such as "upper". "lower", "above", and "below" refer to directions in the drawings to which reference is made. Terms such as "front", "back", "rear". "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:
1. A bowfishing bow assembly comprising:
   a bow riser having upper and lower ends extending along an axis and supporting a grip portion;
   a top limb extending from the upper end of the bow riser at an upward angle to the axis of the bow;

a bottom limb extending from the lower end of the riser at a downward angle to the axis of the bow;

a bowstring extending between distal ends of the top limb and the bottom limb to be tensioned by flexure of the top and bottom limbs; and a quiver housing attachable to the bow riser and providing an inwardly tensioned channel extending along the axis of the bow configured to hold an arrow shaft and at least one bore having a longitudinal axis extending perpendicular to the axis of the bow and diameters between 0.25 to 0.35 inches configured to hold at least one arrow tip extending therethrough.

2. The bowfishing bow assembly of claim 1 wherein the quiver housing supports longitudinal extension of an arrow shaft along the axis of the bow and lateral extension of arrow tips perpendicular to the axis of the bow.

3. The bowfishing bow assembly of claim 1 further comprising at least one arrow tip wherein the at least one arrow tip extends along an axis that is perpendicular to the axis of the bow.

4. The bowfishing bow assembly of claim 1 wherein the at least one bore has a depth of approximately 0.1 inches.

5. The bowfishing bow assembly of claim 1 wherein the quiver housing further provides at least one non-cylindrical bore extending along the axis of the bow.

6. The bowfishing bow assembly of claim 5 wherein the at least one non-cylindrical bore has a hexagonal cross section.

7. The bowfishing bow assembly of claim 5 wherein the at least one non-cylindrical bore passes into the inwardly tensioned channel.

8. The bowfishing bow assembly of claim 5 wherein the at least one non-cylindrical bore are at least two different sized hex bores.

9. The bowfishing bow assembly of claim 8 wherein the at least one non-cylindrical bore is between 3/32 inches and 3/8 inches in diameter.

10. The bowfishing bow assembly of claim 1 wherein the quiver housing supports an axis of rotation of the quiver housing substantially parallel to the axis of the bow.

11. The bowfishing bow assembly of claim 1 wherein the quiver housing is attachable to the bow riser by means of a screw passing through the bow riser.

12. The bowfishing bow assembly of claim 1 wherein the quiver housing is attachable to the bow riser by means of a tension clip clipping onto the bow riser.

13. A quiver for holding a bowfishing arrow shaft comprising:

a housing extending longitudinally between a top and a bottom of the bowfishing arrow shaft along an axis;

a retention clip supported by the housing providing a pair of arms extending outwardly from the housing wherein the pair of arms provide a support channel therebetween adapted to hold the bowfishing arrow shaft along the axis; and at least one bore supported by the housing having a diameter between 0.25 to 0.35 inches adapted to hold at least one arrow tip substantially perpendicular to the axis.

14. The quiver of claim 13 wherein the at least one bore has a cylindrical cross section.

15. The quiver of claim 13 further comprising at least one non-cylindrical bore supported by the housing adapted to hold at least one manual tool.

16. The quiver of claim 15 wherein the at least one non-cylindrical bore has a hexagonal cross section.

* * * * *